United States Patent [19]

Iwami et al.

[11] 4,060,657
[45] Nov. 29, 1977

[54] COATING COMPOSITIONS

[75] Inventors: Isamu Iwami; Hideo Kinoshita, both of Kawasaki, Japan

[73] Assignee: Asahi-Dow Limited, Tokyo, Japan

[21] Appl. No.: 671,742

[22] Filed: Mar. 30, 1976

[30] Foreign Application Priority Data

Apr. 3, 1975 Japan ................................. 50-39754
Feb. 4, 1976 Japan ................................. 51-10276

[51] Int. Cl.$^2$ .......................... D02G 3/36; B32B 17/10
[52] U.S. Cl. ............................. 428/375; 260/29.6 TA; 260/29.6 HN; 428/272; 428/273; 428/274; 428/278; 428/279; 428/288; 428/290; 428/394; 428/395; 428/436; 428/442; 428/460; 428/463; 428/474; 428/483; 428/510; 428/518; 428/522; 428/524; 428/526
[58] Field of Search ............... 428/442, 500, 463, 460, 428/522, 436, 378, 395, 375, 412, 483, 474, 518, 510, 524, 526, 394, 272, 273, 274, 278, 279, 288, 290; 260/29.6 TA, 29.6 HN

[56] References Cited

U.S. PATENT DOCUMENTS

| | | | |
|---|---|---|---|
| 3,361,696 | 1/1968 | Bolgiano | 428/442 |
| 3,488,215 | 1/1970 | Shepherd | 428/441 |
| 3,597,384 | 8/1971 | Kugler | 260/17 |
| 3,865,619 | 2/1975 | Pennewiss | 428/442 |
| 3,968,311 | 7/1976 | Hekal | 428/500 |
| 3,970,628 | 7/1976 | Connelly | 428/500 |

*Primary Examiner*—Ellis Robinson
*Attorney, Agent, or Firm*—Cooper, Dunham, Clark, Griffin & Moran

[57] ABSTRACT

A coating composition comprising (a) a hydrophilic copolymer of ethylene, alpha,beta-ethylenically unsaturated carboxylic acid and polyvalent alcohol monoester of alpha,beta-ethylenically unsaturated carboxylic acid, (b) a water-soluble base, (c) water, and if required, (d) one or more compounding agents, can form on substrates such as glass, plastics, metals and fibers films having excellent hydrophilic nature, water resistance, surface hardness, resistance to scuffing, adhesion to the substrates, and the like.

36 Claims, No Drawings

COATING COMPOSITIONS

This invention relates to an aqueous coating composition which can form films having high hydrophilicity and excellent physical properties such as water resistance, adhesion to substrates, transparency, smoothness, surface hardness, resistance to scuffing, and the like. The coating composition of the present invention can provide substrates such as glass, metals, plastics, fibers, and the like with various functions such as nonfogging, antistatic properties, resistance to stains, suitability as medical supplies, and the like, by forming films on the substrates.

Heretofore various hydrophilic coating compositions have been proposed, but no composition can provide the above-mentioned physical properties at the same time (U.S. Pat. Nos. 3,597,384 and 3,488,215). Even if the hydrophilic nature is sufficient, the film formed is poor in water resistance or adhesion to substrates or sometimes brittle in the dry state or insufficient in smoothness, surface hardness, and the like (German Offenlengungsschrift No. 2,009,296). In any case, such a composition has various problems in practical applications. On the other hand, most coating compositions which have been provided contain organic solvents, which give various problems from viewpoints of public health, safety, as well as saving of resources. Therefore, an aqueous coating composition having excellent hydrophilic nature and the physical properties as mentioned above has long been desired.

The present inventors have accomplished the present invention based on the finding that an aqueous composition containing a hydrophilic copolymer having units of ethylene satisfies the requirements for practical applications as mentioned above.

It is an object of the present invention to provide an aqueous coating composition having excellent hydrophilic nature and the physical properties as mentioned above.

The present invention provides a coating composition comprising a. a hydrophilic copolymer of 60 to 20% by mole of ethylene, 20 to 1% by mole of alpha,beta-ethylenically unsaturated carboxylic acid and 20 to 79% by mole of polyvalent alcohol monoester of alpha,beta-ethylenically unsaturated carboxylic acid, b. a water-soluble base, c. water, and, if necessary, d. one or more compounding agents.

The components of the coating composition are explained below.

a. The hydrophilic copolymer is a copolymer of (i) ethylene, (ii) an alpha,beta-ethylenically unsaturated carboxylic acid and (iii) a polyvalent alcohol monoester of alpha,beta-ethylenically unsaturated carboxylic acid.

i. The monomeric units derived from ethylene are the most important ones which give maximum effect at low concentration compared with other comonomers, on improving water resistance, adhesion to substrates, and brittleness in the dry state, which are most important defects of the conventional hydrophilic polymers. Introduction of the monomeric units of ethylene, which has smallest molecular weight, in the copolymer makes the decrease of hydrophilic nature of the copolymer minimum and improves not only water resistance and brittleness in the dry state which are necessary for practical use, but also adhesion to substrates, beyond any expectation. The proportion of ethylene in the copolymer is 60 to 20% by mole. If the proportion is more than 60% by mole, although water resistance and brittleness in the dry state may be improved remarkably, hydrophilic nature is unfavorably lowered. If the proportion is less than 20% by mole, improvement in the physical properties is insufficient.

ii. The monomeric units derived from alpha,beta-ethylenically unsaturated carboxylic acid have effects on making the hydrophilic copolymer water-soluble by reacting the latter with a water-soluble base and forming a film insoluble in water with excellent surface hardness by cross-linking the functional groups utilizing thermal treatment, and the like.

As the alpha,beta-ethylenically unsaturated carboxylic acids, those having 3 to 9 carbon atoms such as acrylic acid, methacrylic acid, crotonic acid, itaconic acid, maleic acid, fumaric acid, cinnamic acid, and the like are preferable. Among them, methacrylic acid and acrylic acid are more preferable industrially.

The proportion of the alpha,beta-ethylenically unsaturated carboxylic acid in the copolymer is 20 to 1% by mole, preferably 15 to 2% by mole. If the proportion is more than 20% by mole, hydrophilic nature is lowered and if the proportion is less than 1% by mole, it is difficult to make the copolymer water-soluble.

iii. The monomeric units derived from polyvalent alcohol monoester of alpha,beta-ethylenically unsaturated carboxylic acid have an effect on controlling hydrophilic nature of the copolymer. Said component is derived from an alpha,beta-ethylenically unsaturated carboxylic acid as described in the above item (ii) and from a polyvalent alcohol, which form a monoester structure. As the polyvalent alcohol, those having 2 to 6 carbon atoms such as ethylene glycol, propylene glycol, glycerin, diethylene glycol, triethylene glycol, dipropylene glycol, and the like are preferable. Among them, ethylene glycol is most preferable industrially.

The proportion of the polyvalent alcohol monoester of alpha,beta-ethylenically unsaturated carboxylic acid in the copolymer is 20 to 79% by mole, preferably 25 to 78% by mole.

b. The water-soluble base is a component necessary for making the hydrophilic copolymer water-soluble. As the water-soluble bases, ammonia and amines are principally used and sometimes basic alkali metal compounds can be used. As the amines, aliphatic amines such as monoethylamine, diethylamine, triethylamine, propylamine, butylamine, ethylenediamine, and the like, and aliphatic hydroxy amines such as ethanolamine, dimethylethanolamine, and the like are mainly used. However, if required, other amines such as pyridine, morpholine, benzylamine, aniline, and the like may be used. Examples of the basic alkali metal compounds are sodium hydroxide, potassium hydroxide, sodium carbonate, potassium carbonate, sodium bicarbonate, and the like.

The amount of the water-soluble base to be used is that necessary for neutralizing a part or the whole of the carboxyl groups in the hydrophilic coplymer. In general, 0.01 to 50 parts by weight, preferably 0.1 to 25 parts by weight, of the water-soluble base per 100 parts by weight of the hydrophilic copolymer is used.

The water-soluble base has effects not only on making the hydrophilic copolymer water-soluble but also, to our surprise, if some kinds of the bases are used, on greatly improving surface hardness of the film while maintaining excellent hydrophilic nature and other good physical properties. In this sense, amines are particularly preferable.

c. Water is used as a solvent in the coating composition of the present invention. It is preferable from viewpoints of economics, public health and safety. The amount of water to be used changes widely depending on purposes of applications but in general 100 to 1000 parts by weight of water are preferably used per 100 parts by weight of the hydrophilic copolymer.

In some cases, depending on coating conditions, a part of the water, and in special cases almost all the water containing the water-soluble base may be replaced by a water-soluble organic solvent such as methanol, ethanol, isopropanol, dimethylformamide, and the like.

d. The coating composition may contain one or more compounding agents or additives such as curing catalysts, cross-linking agents, surface active agents, flow control agents, pigments, coloring agents, other polymeric solutions, and the like.

As the curing catalysts, conventional ones such as sulfonic acids and the like may be used. If ammonia is used as the water-soluble base in the coating composition, since surface hardness of the formed film is inferior to that of the film formed by using an amine, it is preferable to use water-soluble sulfonic acids such as benzenesulfonic acid, p-toluenesulfonic acid, and the like, as the curing catalyst in an amount of preferably 0.1 to 2 parts by weight per 100 parts by weight of the hydrophilic copolymer. By using such a curing catalyst, a film excellent in surface hardness and resistance to scuffing while maintaining excellent hydrophilic nature can be obtained. This is one of features of the present invention.

As the cross-linking agents, aminoplasts such as condensation products of formaldehyde with urea, melamine, benzoguanamine, and the like, epoxy compounds such as bisphenol A epichlorhidrin, vinyl cyclohexene diepoxide, butadiene diepoxide, and the like, polyvalent block isocyanates such as a reaction product of phenol with prepolymer obtained from trimethylol propane and tolylene diisocyanate, and the like can be used in order to improve the surface hardness. The amount of the cross-linking agent to be used is preferably 1 to 10 parts by weight per 100 parts by weight of the hydrophilic copolymer.

Surface active agents are used in the coating composition in order to increase wettability of the surface of the formed film and to prevent fogging which appears after the moisture absorption attains to the saturated state and lowers reflection or transparency of the substrate. In the case of preventing fogging, it is necessary and more effective that the coating film has hydrophilic nature and greater surface hardness from the aspect of durability of the surface active agent. As the surface active agents, water-soluble and nonionic surface active agents are preferable. Examples of such surface active agents are polyoxyethylene alkylphenyl ether, polyoxyethylene alkyl ether, polyoxyethylene sorbitane ester, and the like. In general, the surface active agent is used in an amount of preferably 1 to 10 parts by weight per 100 parts by weight of the hydrophilic copolymer.

As the polymeric solutions, polymeric emulsions of acrylic polymers, vinyl acetate polymers and the like, or polymeric aqueous solutions of polyvinyl alcohol, acrylic polymers, cellulose derivatives and the like may be used.

The compounding agents or additives can be used alone or as a mixture of two or more kinds of additives. For example, if a mixture of a surface active agent and a curing catalyst is added to the coating composition, a film having remarkable hydrophilic nature and excellent surface hardness can be formed on the substrate.

The hydrophilic copolymer used in the coating composition can be prepared as follows:

A. Direct copolymerization of each monomer corresponding to ethylene, an alpha, beta-ethylenically unsaturated carboxylic acid and a polyvalent alcohol monoester of alpha, beta-ethylenically unsaturated carboxylic acid; and B. Stepwise preparation comprising copolymerization of ethylene and an alpha,beta-ethylenically unsaturated carboxylic acid and the subsequent reaction of the resulting copolymer with (I) a polyvalent alcohol, (II) a 1,2-epoxy compound or (III) an alkylene carbonate in order to convert the desired amount of the carboxyl groups to polyvalent alcohol monoesters.

The direct copolymerization method as mentioned in above (A) has the following disadvantages. Since a polyvalent alcohol monoester, for example, ethylene glycol methacrylate, inevitably accompanies such a by-product as ethylene glycol dimethacrylate which has a crosslinking function and which can only be removed with great difficulty, the use of such a polyvalent alcohol monester accompanying the by-product would give unfavorable gel insolbule in the solvent, etc.

The method of reacting a copolymer of ethylene and alpha,beta-ethylenically unsaturated carboxylic acid with a polyvalent alcohol as mentioned above (B) (I) is also not preferable, since gel is easily produced. On the other hand, the methods of reacting a copolymer of ethylene and alpha, alpha,beta-ethylenically unsaturated carboxylic acid with a 1,2-epoxy compound or an alkylene carbonate as mentioned above (B) (I) and (III) are most preferable, since the hydrophilic copolymers containing no gel can easily be produced.

The copolymerization of ethylene and alpha,beta-ethylenically unsaturated carboxylic acid can be carried out by using conventional solution polymerization, emulsion polymerization or the like. In general, ethylene pressure of 10 to 200 kg/cm$^2$ and reaction temperature of 50° to 100° C may be employed. As polymerization catalyst, there may be used azobisisobutyronitrile, benzoyl peroxide, potassium persulfate, and the like. As a solvent, benzene, hexane, butanol, ethanol, water, and the like, alone or as a mixture thereof, may be used.

Degree of polymerization of the resulting ethylene copolymer can be controlled by the kind of solvent, polymerization temperature, the amount of catalyst, and the like, and in general, it is preferably 0.1 to 1.0 in terms of reduced viscosity ($\eta_{sp}/c$) measured in methanol at 30° C with concentration of 0.1 g/dl.

The reaction of the resulting ethylene-alpha,beta-ethylenically unsaturated carboxylic acid copolymer with a 1,2-epoxy compound or an alkylene carbonate can be carried out as follows. As the 1,2-epoxy compounds, ethylene oxide, propylene oxide, and the like may be used. As the alkylene carbonates, ethylene carbonate, propylene carbonate, and the like may be used. The reaction can generally be carried out in a autoclave or a conventional vessel. As a solvent, in general, an aliphatic alcohol such as methanol, ethylene glycol, or the like may be used alone, or a mixture of an aliphatic alcohol with an aromatic compound such as benzene, toluene, xylene or the like, or a mixture of an aliphatic alcohol with water may be used. As a reaction catalyst, a basic catalyst such as sodium hydroxide, sodium carbonate, or the like is mainly used. Reaction temperature of 30° to 180° C may generally be used.

The thus obtained hydrophilic copolymer consists of three monomeric units of ethylene, alpha,beta-ethylenically unsaturated carboxylic acid and polyvalent alcohol monoester of alpha,beta-ethylenically unsaturated carboxylic acid; this is identified by analyses using NMR and IR spectra. Reduced viscosity of the hydrophilic copolymer is generally 0.1 to 0.6 measured in methanol at 30° C with concentration of 0.1 g/dl. However, since the hydrophilic copolymer can form a water-insoluble film by cross-linking with thermal treatment and the like, it is not necessary to limit the degree of polymerization. In an extreme case, so-called prepolymer having very low molecular weight may be used.

The coating composition is prepared by adding the water-soluble base and water, and if required, one or more compounding agent to the hydrophilic copolymer thus prepared.

The coating composition of the present invention can be coated on substrates by using conventional coating methods such as dip, spray, roll, flow coatings and the like, and subsequently dried and baked with heated air, far infrared rays, and the like to form a film. Drying and baking temperature is about 50° to 260° C, preferably 100° to 200° C. In special cases, films can be formed by irradiation of ultraviolet rays, gamms rays, electron rays, and the like.

Thickness of the film formed is usually 10 – 50 microns. The film is generally formed by one or several coatings with the same coating composition solution and drying, but in some cases, laminated films can be formed by using different coating composition solutions.

As mentioned above, the films formed by coating, drying and baking the coating compositions of the present invention are excellent not only in hydrophilic nature but also in water resistance, adhesion to substrates, surfaces hardness and the like without becoming brittle in the dry state. Further since the coating composition is an aqueous solution, the films formed are excellent in surface appearance such as smoothness, transparency, gloss and the like, so that it is very difficult to distinguish a substrate not coated from that coated with the coating composition.

In addition, the formed films have other excellent physical properties, which are necessary for practical applications, such as resistance to weathering, heat, cold, and chemicals, as well as excellent nonfogging, antistatic properties, resistance to stains, and the like. Semiconducting properties are also observed in the wet state.

As the substrates, glass, metals, plastics, and fibers, and in some cases, paper, wood, stone, cement, and the like can be used. As glass, transparent glass used mainly in windows, vehicles, and the like, or mirrors, lenses, and the like can be used. As the metals, aluminum, iron, steel, stainless steel, and the like can mainly be used. Films can be formed directly on the metals or on paint coated metals. As the plastics, stretched or non-stretched shaped articles of poly(methyl methacrylate), polycarbonates, polyesters, nylons, styrene, resins, vinyl chloride or vinylidene chloride resins, polyolefin resins, cellulosic derivatives including cellophane and the like can be used. As the fibers, polyesters, nylons, polyacrylonitrile, polyvinyl chloride, polyvinylidene chloride, polyolefins, cellulosic fibers and the like can be used.

The present invention is explained more in detail by the following examples, in which parts and percentages are by weight unless otherwise specified.

EXAMPLE 1 i. Preparation of ethylene-methacrylic acid copolymer

In an autoclave, 100 g of methacrylic acid and 1.0 g of benzoyl peroxide were dissolved in 900 g of tert-butanol. Then ethylene is fed to the autoclave, and the copolymerization was carried out at 70° C for 3 hours under ethylene pressure of 50 kg/cm$^2$. After adding n-hexane to the reaction mixture, the product was deposited and separated to give 78 g of an acid copolymer (A). In the same manner as mentioned above except for employing ethylene at a pressure of 20 kg/cm$^2$, an acid copolymer (B) was obtained. For comparison, an acid polymer (C) was obtained by polymerizing methacrylic acid in solution without using ethylene. Ethylene content and reduced viscosity of each acid copolymer are as set forth in Table 1.

Table 1

| Acid copolymer | Ethylene content [1] (% by mole) | Reduced viscosity [2] |
|---|---|---|
| (A) | 51.9 | 0.58 |
| (B) | 36.9 | 0.52 |
| (C) | 0 | 0.60 |

[1] Ethylene content was measured by N.M.R.
analysis as follows:
Apparatus: Nippon Denshi MH 100
Solvent: Heavy hydrogenated methanol
Concentration: 10%
Temperature at measuring: Room temperature
R.F. level: 0.1
A.F. level: 0.5
Analysis was based on the following assignment.

| Chemical shifts (ppm) | Assignment |
|---|---|
| a: 0.6 – 1.6<br>b: 1.90 | $\quad\quad\quad\quad\quad\quad CH_3$<br>$\quad\quad\quad\quad\quad\quad\mid a$<br>$-(CH_2CH_2)_m-(CH_2C)_n-$<br>$\quad\quad a\quad\quad a\quad\quad b\ \mid$<br>$\quad\quad\quad\quad\quad\quad CO_2H$<br>(TMS standard) |

[2] Solvent: Methanol
Concentration: 0.1 g/dl
Temperature at measuring: 30° C ii. Hydroxyethylation In a flask, 60 g of the acid copolymer (A) was dissolved in 600 g of ethylene glycol and then 240 g of ethylene carbonate and 0.6 g of sodium carbonate were added thereto. The reaction was carried out at 130° C for 5 hours. After addition of aqueous solution of sulfuric acid, the reaction product was deposited and separated to give 68 g of a hydrophilic copolymer A. In the same manner, the hydrophilic copolymer B was obtained from the acid copolymer (B) and the hydrophilic copolymer C (comparison) was obtained from the acid polymer (C). Components and their proportions of each hydrophilic copolymer are as set forth in Table 2.

Table 2

| Hydrophilic copolymer | | A | B | C |
|---|---|---|---|---|
| Component [1]<br>(% by mole) | Ethylene | 51.9 | 36.9 | 0 |
| | Methacrylic acid [a] | 4.8 | 6.3 | 10.0 |
| | Hydroxyethyl methacrylate [b] | 43.3 | 56.8 | 90.0 |
| Degree of | | | | |

Table 2-continued

| Hydrophilic copolymer | A | B | C |
|---|---|---|---|
| hydroxyethylation (%) *2 [b/(a + b) × 100] | 90 | 90 | 90 |
| Reduced viscosity *3 | 0.34 | 0.27 | 0.34 |

Note)
*1 The hydrophilic copolymers were treated with an aqueous solution of sodium hydroxide and analyzed by infrared absorption spectra. There were observed absorptions of a sodium salt moiety of carboxylic acid (1500 - 1600 cm$^{-1}$), an ester group of carboxylic acid (1725 cm$^{-1}$) and a hydroxyl group (3400 cm$^{-1}$). Absorbance ratio of the ester group and the hydroxyl group was in agreement with those of the hydroxyethyl methacrylate monomer. Thus it was identified that the hydrophilic copolymers contained monomeric units of methacrylic acid and hydroxyethyl methacrylate.
*2 It was calculated from the absorbance ratio of the ester group (1725 cm$^{-1}$) and the salt moiety of carboxylic acid (1500 - 1600 cm$^{-1}$) obtained from the infrared spectra.
*3 Solvent: Methanol
  Concentration: 0.1 g/dl
  Temperature at measuring: 30° C iii. Preparation of coating compositions The hydrophilic copolymer A (30 g) was dissolved in 170 g of water containing 0.65 g of ammonia to give a transparent aqueous composition A containing 15% by weight of the hydrophilic copolymer A. In the same manner a composition B and a composition C (comparison) were obtained from the hydrophilic copolymers B and C, respectively.

EXAMPLE 2

The compositions A and B obtained in Example 1 were coated on a surface of a glass plate and dried and baked with heated air at 180° C for 30 minutes to give Samples A and B. The formed films of Samples A and B were excellent in smoothness, transparency and gloss, so that it was impossible to distinguish the coated glass plates from untreated one. For comparison, the composition C was coated on a glass plate and dried and baked in the same manner to give Sample C. Thickness of each coated film was 30 ± 5 microns.

Physical properties of each coated film are as set forth in Table 3.

Table 3

| Physical properties | | Sample A | B | C (comparison) |
|---|---|---|---|---|
| Hydrophilic nature | Nonfogging effect *1 (sec) | 53 | 71 | 75 |
| | Water resistance *2 | No change | No change | Swollen in part |
| Resistance to water | Resistance to hot water *3 | No change | No change | Peeled in part |
| | Resistance to boiling water *4 | >1 hour No change | >1 hour No change | Peeled within 30 minutes |
| | Cross cut test *5 | 100/100 | 90/100 | 40/100 |
| Adhesion to substrate | Drawing test *6 (points) | 10 | 10 | 6 |
| Brittleness | Cutting test *7 | Not peeled | Not peeled | Peeled |
| Hardness | Pencil hardness *8 | H – 2H | 2H | 2H |

Note)
*1 Time (in seconds) required for producing fogging when nitrogen gas of 40° C containing saturated vapor is blown at the rate of 52 cc/min . cm$^2$ to the film to be tested kept at 35° C was measured. When an untreated glass plate was used, it took 3 - 4 seconds.
*2 Surface appearance of the sample was observed after dipping it in water at 23° C for 100 hours.
*3 Surface appearance of the sample was observed after dipping it in hot water at 60° C for 24 hours.
*4 The sample was dipped in boiling water and its surface appearance was observed.
*5 100 squares (10 × 10), each side being 1 mm long, were made using a razor blade on the surface of the film formed sample at the dry state and the number of squares retained on the surface after removing peeled squares with an adhesive tape was counted. There is a detailed description on page 255 of "Toso-gizyutsu Binran" (Manual of Coating Techniques) published by Nikkan Kogyo Shinbun Sha, Japan, in 1972.
*6 Spirals (having doubling parts) were drawn with a sharp pointed needle loading 200 g thereon on the surface of the film formed sample at the dry state and the state of peeling was evaluated according to the standard of Japanese Association of Paint Industries. (10 points is the best and 0 point is the worst.) There is a detailed description on page 255 of "Toso-gizyutsu Binran" mentioned above.
*7 The film was cut with a razor blade and peeling of the surrounding parts was observed. The sample was tested at dry state.
*8 The sample was tested at a temperature of 23° C and relative humidity of 50%.

As is clear from Table 3, introduction of the monomeric units of ethylene into the hydrophilic copolymer only lowers hydrophilic nature of the formed film to the minimum and improves not only water resistance and brittle at the dry state but also adhesion to substrates greatly, these physical properties being necessary for practical applications.

The coated films formed from the compositions A and B also showed excellent results in resistance to weathering, heat, and cold.

EXAMPLE 3

Five coating compositions containing 15% of the hydrophilic copolymer were prepared by adding water-soluble bases as set forth in Table 4 to the hydrophilic copolymer B obtained in Example 1. The water-soluble bases were used two times as much as required for neutralizing the carboxyl groups of the hydrophilic copolymer B. Each composition was coated on a surface of a glass plate and dried and baked with heated air at 180° C for 30 minutes. Thickness of each coated film was 30 ± 5 microns.

Physical properties of each coated film measured in the same manner as in Example 2 are set forth in Table 4.

Table 4

| | | Physical properties | | |
|---|---|---|---|---|
| Run No. | Water-soluble base | Pencil hardness | Nonfogging effect (sec) | Water resistance |
| 1 | Ammonia | 2H | 71 | No change |
| 2 | Monoethylamine | 4H | 68 | " |
| 3 | Diethylamine | 4H | 60 | " |
| 4 | Ethylenediamine | 3H – 4H | 75 | " |
| 5 | Ethanolamine | 3H | 88 | " |

As is clear from Table 4, the use of amines as the water-soluble base improves surface hardness remarkably while maintaining good hydrophilic nature.

EXAMPLE 4

A composition was prepared by adding paratoluenesulfonic acid (hereinafter referred to as PTS) to the composition B obtained in Example 1. 0.3 part of PTS per 100 parts of the hydrophilic copolymer B was added to the composition B. The resulting composition was coated on a surface of a glass plate and dried and baked with heated air at 180° C for 30 minutes. Thickness of the coated film was 30 ± 5 microns.

Physical properties of the coated film measured in the same manner as in Example 2 together with the data of the composition B obtained in Example 2 are set forth in Table 5.

Table 5

| Proportion of PTS | Physical properties | | |
|---|---|---|---|
| | Pencil hardness | Nonfogging effect (sec) | Water resistance |
| 0 % | 2H | 71 | No change |
| 0.3 % | 3H – 4H | 69 | " |

As is clear from Table 5, when a curing catalyst of PTS is added to the composition containing ammonia as the water-soluble base, surface hardness of the coated film can be improved remarkably while maintaining good hydrophilic nature. Further resistance to scuffing of the coated film is also excellent.

Resistance to scuffing is measured as follows.

The coated surface of the sample was rubbed with wiping cloth for glasses or gauze with load of 100 g/cm$^2$ 1000 times in reciprocating motion and the presence of scuffing was evaluated.

EXAMPLE 5

To the composition A obtained in Example 1, 2 or 5 parts of aminoplast of urea type (a ureafolmaldehyde condensate manufactured by Sanwa Chemical Co., Ltd., MX201) per 100 parts of the hydrophilic copolymer A was added to give compositions as listed in Table 6. Each composition was coated on a surface of a glass plate and dried and baked with heated air at 180° C for 30 minutes. Thickness of each coated film was 30 ± 5 microns.

Physical properties of each coated film measured in the same manner as in Example 2 are set forth in Table 6.

Table 6

| Run No. | Proportion of aminoplast (%) | Physical properties | | |
|---|---|---|---|---|
| | | Pencil hardness | Nonfogging effect (sec) | Water resistance |
| 1 | 0 | H – 2H | 53 | No change |
| 2 | 2 | 2H – 3H | 49 | " |
| 3 | 5 | 3H – 4H | 41 | " |

As is clear from Table 6, when an aminoplast is used as a cross-linking agent in the composition, remarkable improvement is obtained in surface hardness but hydrophilic nature is lowered slightly. Further resistance to scuffing was also excellent.

EXAMPLE 6

Coating compositions were prepared by adding 2.0, 3.5 or 5.0 parts of a surface active agent (hereinafter refered to as SA) to 100 parts of the hydrophilic copolymer A obtained in Example 1 which had been dissolved in an aqueous solution of monoethylamine. Polyoxyethyl nonylphenyl ether (manufactured by Nikko Chemical Co., Ltd., Nikol NP-10) was used as SA. Each composition was coated on a surface of a glass plate and dried and baked with heated air at 170° C for 20 minutes. Thickness of each coated film was 30 ± 5 microns.

Physical properties of each coated film measured in the same manner as in Example 2 are set forth in Table 7.

Table 7

| Run No. | Proportion of SA (%) | Physical properties | | |
|---|---|---|---|---|
| | | Pencil hardness | Nonfogging effect (sec) | Water resistance |
| 1 | 0 | 3H – 4H | 51 | No change |
| 2 | 2.0 | 4H | >120 *1 | " |
| 3 | 3.5 | 3H – 4H | >120 *1 | " |
| 4 | 5.0 | 3H – 4H | >120 *1 | " |

Note)
*1 Although a water film was produced on the surface, no fogging was produced after 120 seconds.

As is clear from Table 7, when SA is added to the composition containing an amine as the water-soluble base, hydrophilic nature is improved greatly while maintaining excellent surface hardness.

EXAMPLE 7

To the composition A obtained in Example 1, 0.25 part of PTS and/or 3.5 parts of SA per 100 parts of the hydrophilic copolymer A were added to give compositions as set forth in Table 8. SA was the same one as used in Example 6. Each composition was coated on a surface of a glass plate and dried and baked with heated air at 170° C for 20 minutes. Thickness of each coated film was 30 ± 5 microns.

Physical properties of each coated film measured in the same manner as in Example 2 are set forth in Table 8.

Table 8

| Run No. | Proportion of PTS (%) | Proportion of SA (%) | Physical properties | | |
|---|---|---|---|---|---|
| | | | Pencil hardness | Nonfogging effect (sec) | Water resistance |
| 1 | 0.25 | 0 | 3H – 4H | 51 | No change |
| 2 | 0.25 | 3.5 | 4H | >120 | " |
| 3 | 0 | 3.5 | 2H | >120 | " |

As is clear from Table 8, when both PTS and SA are added to the composition containing ammonia as the water-soluble base, it is possible to improve surface hardness and hydrophilic nature greatly.

EXAMPLE 8

The composition A obtained in Example 1 was coated on a polyester film and dried and baked with heated air at 180° C for 30 minutes. The formed film was forced to be peeled off to measure electrical properties. Further resistance to stains of Sample A obtained in Example 2 was also measured.

The results obtained are shown in Table 9.

Table 9

| | Antistatic properties *1 | Half-life | 7 sec |
|---|---|---|---|
| Electrical properties | Volume resistivity at 23° C (Ωcm) | Relative humidity of 50% | 2.1 × 10$^{14}$ |
| | | Wet state | 3 × 10$^6$ |

Table 9-continued

| Resistance to stains | Dirt chamber test *2 at 20° C | Relative humidity of 75% Wet state | Clean Clean |
|---|---|---|---|
| | Prevention of oil stains *3 | Easily wiped off | |

Note)
*1 Measured by the honet meter at 20° C and relative humidity of 65%.
*2 See R.E. Schanzle, Mod. Packaging No. 5, 129 (1964) When a glass plate alone was tested, the result was heavy dirt.
*3 The sample was painted with lip-stick and pomade and allowed to stand at 23° C for 24 hours. Then easiness of wiping off the lip-stick and pomade was tested.

As is clear from Table 9, the composition of the present invention is also effective as antistatic agent and stain resistance agent.

EXAMPLE 9

The composition obtained in Example 7 Run No. 2 containing 0.25% of PTS and 3.5% of SA was coated on one side of a polymethyl methacrylate resin sheet and dried with air and then baked with far infrared rays for 2 minutes. The formed film had good adhesion to the substrate and surface hardness and showed remarkable preventing effect of fogging.

EXAMPLE 10 i. Preparation of ethylene-acrylic acid copolymer

In the same manner as described in Example 1, ethylene and acrylic acid were copolymerized under ethylene pressure of 50 kg/cm$^2$ to give the acid copolymer having the ethylene content of 48.0% by mole and reduced viscosity of 0.51.

ii. Hydroxyethylation

The thus obtained acid copolymer was hydroxyethylated in the same manner as described in Example 1 to give the hydrophilic copolymer having the following components in the following proportions:

| | |
|---|---|
| Ethylene | 48.0% by mole |
| Acrylic acid [a] | 5.2% by mole |
| Hydroxyethyl acrylate [b] | 46.8% by mole |
| Degree of hydroxyethylation [b/(a + b) × 100] | 90% | iii. Preparation of a composition

The resulting hydrophilic copolymer (30 g) was dissolved in 170 g of water containing 0.74 g of ammonia to give a transparent aqueous solution containing 15% by weight of the hydrophilic copolymer.

EXAMPLE 11

The composition obtained in Example 10 was coated on a surface of a glass plate and dried and baked with heated air at 180° C for 30 minutes. Thickness of the formed film was 30 ± 5 microns.

Physical properties of the formed film measured in the same manner as in Example 2 are set forth in Table 10.

Table 10

| | |
|---|---|
| Nonfogging effect | 50 sec. |
| Water resistance | No change |
| Cross cut test | 100/100 |
| Drawing test | 10 points |
| Cutting test | Not peeled |

As is clear from Table 10, when acrylic acid is used as the alpha,beta-ethylenically unsaturated carboxylic acid, excellent hydrophilic nature, water resistance and adhesion to the substrate were obtained without showing brittleness in the dry state.

EXAMPLE 12

The acid copolymer (B) obtained in Example 1 (10 g) was dissolved in 130 g of methanol and 0.2 g of sodium hydroxide was added thereto. After dissolving completely, the resulting solution was placed in an autoclave. Then 7 g of ethylene oxide was charged in the autoclave and the reaction was carried out at 110° C for 6 hours. After the reaction, an aqueous solution of sulfuric acid was added to the reaction mixture to deposit and separate the hydrophilic copolymer having the components as follows:

| | |
|---|---|
| Ethylene | 36.9% by mole |
| Methacrylic acid [a] | 11.4% by mole |
| Hydroxyethyl methacrylate [b] | 51.7% by mole |
| Degree of hydroxyethylation [b/(a + b) × 100] | 82% |

The resulting hydrophilic copolymer (5g) was dissolved in 20 g of water containing 0.22 g of ammonia to give a transparent aqueous solution containing 20% of the hydrophilic copolymer. Then the aqueous solution was coated on a surface of a glass plate and dried and baked in the same manner as in Example 2. The formed film showed excellent nonfogging effect, water resistance and adhesion to the substrate.

EXAMPLE 13

The acid copolymer (B) obtained in Example 1 was hydroxyethylated in the same manner as described in Example 1 except for employing a reaction time of 4 hours in place of 5 hours to give the hydrophilic copolymer having the following components:

| | |
|---|---|
| Ethylene | 36.9% by mole |
| Methacryalic acid [a] | 14.5% by mole |
| Hydroxyethyl methacrylate [b] | 48.6% by mole |
| Degree of hydroxyethylation [b/(a + b) × 100] | 77% |

The composition obtained by dissolving the resulting hydrophilic copolymer in ammonia water was coated on a surface of a glass plate and dried and baked with heated air at 180° C for 30 minutes. Thickness of the formed film was 30 ± 5 microns. Nonfogging effect was 49 seconds. The formed film was also excellent in water resistance and adhesion to the substrate.

What is claimed is:

1. A water soluble coating composition comprising (a) a hydrophilic copolymer of 60 to 20% by mole of ethylene, 20 to 1% by mole of alpha,beta-ethylenically unsaturated carboxylic acid containing from three to nine carbon atoms and 20 to 79% by mole of polyvalent alcohol monoester of alpha,beta-ethylenically unsaturated carboxylic acid wherein the carboxylic acid moiety contains from three to nine carbon atoms, (b) a sufficient amount of a water-soluble base to at least partially neutralize said carboxylic acid, and (c) water.

2. A coating composition according to claim 1, wherein the alpha,beta-ethylenically unsaturated carboxylic acid is acrylic acid or methacrylic acid.

3. A coating composition according to claim 1, wherein the polyvalent alcohol monoester of alpha,beta-ethylenically unsaturated carboxylic acid is a polyvalent alcohol monoester of acrylic acid or methacrylic acid.

4. A coating composition according to claim 1, wherein the polyvalent alcohol moiety of the polyvalent alcohol monoester of alpha,beta-ethylenically unsaturated carboxylic acid has 2 to 6 carbon atoms.

5. A coating composition according to claim 1, wherein the polyvalent alcohol moiety of the polyvalent alcohol monoester of alpha,beta-ethylenically unsaturated carboxylic acid is ethylene glycol.

6. A coating composition according to claim 1, wherein the water-soluble base is ammonia.

7. A coating composition according to claim 1, wherein the water-soluble base is an amine.

8. A coating composition according to claim 7, wherein the amine is an aliphatic amine or aliphatic hydroxy amine.

9. A coating composition according to claim 7, wherein amine is monoethylamine, diethylamine, triethylamine, propylamine butylamine, ethylenediamine, ethanolamine or dimethylethanolamine.

10. A coating composition according to claim 1, wherein the amount of the water-soluble base is that required for neutralizing a part or the whole of the carboxyl groups in the hydrophilic copolymer.

11. A coating composition according to claim 1, wherein 100 to 1000 parts by weight of water is used per 100 parts by weight of the hydrophilic copolymer.

12. A water soluble coating composition comprising (a) a hydrophilic copolymer of 60 to 20% by mole of ethylene, 20 to 1% by mole of alpha,beta-ethylenically unsaturated carboxylic acid containing from three to nine carbon atoms and 20 to 79% by mole of polyvalent alcohol monoester of alpha,beta-ethylenically unsaturated carboxylic acid wherein the carboxylic acid moiety contains from three to nine carbon atoms, (b) a sufficient amount of water-soluble base to at least partially neutralize said carboxylic acid, (c) water and (d) one or more compounding agents.

13. A coating composition according to claim 12, wherein the alpha,beta-ethylenically unsaturated carboxylic acid is acrylic acid or methacrylic acid.

14. A coating composition according to claim 12, wherein the polyvalent alcohol monoester of alpha,beta-ethylenically unsaturated carboxylic acid is a polyvalent alcohol monoester of acrylic acid or methacrylic acid.

15. A coating composition according to claim 12, wherein the polyvalent alcohol moiety of the polyvalent alcohol monoester of alpha,beta-ethylenically unsaturated carboxylic acid has 2 to 6 carbon atoms.

16. A coating composition according to claim 12, wherein the polyvalent alcohol moiety of the polyvalent alcohol monoester of alpha,beta-ethylenically unsaturated carboxylic acid is ethylene glycol.

17. A coating composition according to claim 12, wherein the water-soluble base is ammonia.

18. A coating composition according to claim 12, wherein the water-soluble base is an amine.

19. A coating composition according to claim 18, wherein the amine is an aliphatic amine or aliphatic hydroxy amine.

20. A coating composition according to claim 18, wherein the amine is monoethylamine, diethylamine, triethylamine, propylamine, butylamine, ethylenediamine, ethanolamine or dimethylethanolamine.

21. A coating composition according to claim 12, wherein the amount of the water-soluble base is that required for neutralizing a part or the whole of the carboxyl groups in the hydrophilic copolymer.

22. A coating composition according to claim 12, wherein 100 to 1000 parts by weight of water is used per 100 parts by weight of the hydrophilic copolymer.

23. A coating composition according to claim 12, wherein the compounding agents is at least one of a surface active agent, a cross-linking agent and a curing catalyst.

24. A coating composition according to claim 23, wherein the surface active agent is water-soluble.

25. A coating composition according to claim 23, wherein the surface active agent is a water-soluble nonionic surface active agent.

26. A coating composition according to claim 23, wherein 1 to 10 parts by weight of surface active agent is used per 100 parts by weight of the hydrophilic copolymer.

27. A coating composition according to claim 23, wherein the curing catalyst is sulfonic acid.

28. A coating composition according to claim 27, wherein the curing catalyst is para-toluene sulfonic acid.

29. A coating composition according to claim 23, wherein 0.1 to 2 parts by weight of the curing catalyst is used per 100 parts by weight of the hydrophilic copolymer.

30. A coating composition according to claim 23, wherein the cross-linking agent is a water-soluble aminoplast.

31. A coating composition according to claim 23, wherein 1 to 10 parts by weight of the crosslinking agents is used per 100 parts by weight of the hydrophilic copolymer.

32. A coating article obtained by coating a substrate with the coating composition as claimed in claim 1, and forming a water-insoluble film on the substrate.

33. A coated article according to claim 32, wherein the substrate is glass, plastics, metals or fibers.

34. A water-soluble coating composition comprising (a) a hydrophilic copolymer of 20 to 50% by mole of ethylene, 1 to 10% by mole of alpha,beta-ethylenically unsaturated carboxylic acid containing from three to nine carbon atoms and 40 to 79% by mole of polyvalent alcohol monoester of alpha,beta-ethylenically unsaturated carboxylic acid wherein the carboxylic acid moiety contains from three to nine carbon atoms, (b) a sufficient amount of a water-soluble base to at least partially neutralize said carboxylic acid and (c) water.

35. A coated article obtained by coating a substrate with a coating composition as claimed in claim 12, and forming a water-insoluble film on the substrate.

36. A coated article according to claim 35, wherein the substrate is glass, plastics, metals or fibers.

* * * * *